(12) United States Patent
Uetsuka et al.

(10) Patent No.: US 10,989,981 B2
(45) Date of Patent: Apr. 27, 2021

(54) OPTICAL BEAM DEFLECTION ELEMENT AND MODULE

(71) Applicant: NATIONAL INSTITUTE OF ADVANCED INDUSTRIAL SCIENCE AND TECHNOLOGY, Tokyo (JP)

(72) Inventors: Hisato Uetsuka, Tsukuba (JP); Masahiro Ookawa, Tsukuba (JP); Bing Yao, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 16/468,644

(22) PCT Filed: Dec. 7, 2017

(86) PCT No.: PCT/JP2017/044043
§ 371 (c)(1),
(2) Date: Feb. 10, 2020

(87) PCT Pub. No.: WO2018/110431
PCT Pub. Date: Jun. 21, 2018

(65) Prior Publication Data
US 2020/0209705 A1    Jul. 2, 2020

(30) Foreign Application Priority Data

Dec. 13, 2016  (JP) .............................. JP2016-241575

(51) Int. Cl.
*G02F 1/29*  (2006.01)
(52) U.S. Cl.
CPC ............ *G02F 1/29* (2013.01); *G02F 2203/24* (2013.01)

(58) Field of Classification Search
CPC .............................. G02F 1/29; G02F 2203/24
See application file for complete search history.

(56) References Cited

U.S. PATENT DOCUMENTS

| 4,850,682 A | 7/1989 | Gerritsen |
| 7,692,759 B2 | 4/2010 | Escuti et al. |
| (Continued) | | |

FOREIGN PATENT DOCUMENTS

| JP | 2008532085 A | 8/2008 |
| JP | 2010525395 A | 7/2010 |
| (Continued) | | |

OTHER PUBLICATIONS

International Preliminary Report on Patentability, PCT/JP2017/044043, Jun. 18, 2019, Japan International Search Authority, National Institute of Advanced Industrial Science and Technology.

(Continued)

*Primary Examiner* — Hoan C Nguyen
(74) *Attorney, Agent, or Firm* — Workman Nydegger

(57) ABSTRACT

With the conventional optical deflection elements using polarization gratings (PGs), it has been difficult to independently switch multiple optical beams at one time in a variety of angular ranges and angular steps at high speed on the µ-second time scale, and it has been impossible to achieve a highly reliable optical deflection element module capable of operating at different ambient temperatures. Provided is an optical deflection element including: a polarization grating plate having a rectangular or circular segment structure, in which the cycles Λ of PGs are not uniform within the plate plane and the cycle and/or the rotational direction of a birefringence axis varies; and a phase panel having a segment structure that is accordingly segmented within the same plane are bonded together, wherein their corresponding segments overlap with each other, and optical switches (Continued)

of the polarization gratings are controlled by a voltage change in the phase panel.

16 Claims, 16 Drawing Sheets

(56) References Cited

U.S. PATENT DOCUMENTS

| | | | |
|---|---|---|---|
| 8,987,313 B2 | 3/2015 | Desai et al. | |
| 2008/0278675 A1 | 11/2008 | Escuti et al. | |
| 2010/0231847 A1 | 9/2010 | Escuti | |
| 2012/0188467 A1* | 7/2012 | Escuti | G02B 27/286 349/1 |
| 2012/0314180 A1* | 12/2012 | Hashimoto | G02F 1/0136 349/194 |
| 2013/0335683 A1* | 12/2013 | Escuti | G02F 1/1393 349/96 |
| 2014/0268328 A1* | 9/2014 | Dorschner | G02B 5/3041 359/484.01 |
| 2014/0361990 A1* | 12/2014 | Leister | G02B 30/26 345/156 |
| 2018/0143508 A1 | 5/2018 | Uetsuka et al. | |

FOREIGN PATENT DOCUMENTS

| | | |
|---|---|---|
| JP | 2012505430 A | 3/2012 |
| WO | 2016175071 A1 | 12/2017 |

OTHER PUBLICATIONS

Technology and Applications of LCoS, Chapter 18, Sections 18.3. 1-18.3.7.1, pp. 714-718.

Extended European Search Report, EP17879870.8, dated Jun. 2, 2020, National Institute of Advanced Industrial Science and Technology.

Kim J et al., "Wide-angle nonmechanical beam steering using thin liquid crystal polarization gratings", Proceedings of SPIE/ IS & T, vol. 7093, Aug. 14, 2008, pp. 709302-1-709302-12, XP002606928.

Paul F. Mcmanamon et al., "A Review of Phased Array Steering for Narrow-Band Electrooptical Systems", Proceedings of the IEEE., vol. 97, No. 6, Jun. 2009, pp. 1078-1096, XP055595505, US.

Pancharatnam, S., "Achromatic Combinations of Birefringent Plates", Reprinted from the Proceedings of the Indian Academy of Sciences, vol. XLI, No. 4, Sec. A, 1955, pp. 137-144.

International Search Report, PCT/JP2017/044043, dated Mar. 13, 2018, Japan International Search Authority, National Institute of Advanced Industrial Science and Technology.

\* cited by examiner

OPTICAL BEAM DEFLECTION ELEMENT AND MODULE

TECHNICAL FIELD

The present invention relates to an optical beam deflection element and module that can deflect optical beams through a wide angle and at a high speed and that is stable at an ambient temperature.

BACKGROUND ART

FIG. 1 illustrates Birefringent prism steering, which has long been realized using pixelated liquid crystal switching elements including liquid crystals, and a birefringent wedge such as calcite or rutile (NPL 1).

However, crystals of calcite separate an ordinary ray from an extraordinary ray only by an angle of approximately 5° and thus pose problems in terms of thickness and manufacturing costs, having failed to be put to wide practical use.

As an element having a deflection and separation function similar to that of the crystals, polarization gratings (PGs) as illustrated in FIG. 2 have been devised.

The polarization grating (PG) is a device in which a birefringence axis spatially rotates with a constant period, and was reported in 1955 (NPL 2). The polarization grating (PG) was also reported in Soviet Journal in 1970 as a polarization hologram.

These articles are merely theoretical, and the theories were later specifically realized as devices using a method in which exposure is performed by making two optical beams overlap at a certain angle, the optical beams corresponding to orthogonal polarized beams of coherent laser light, and using photochromic AgCl as a material.

Later, as a method for realizing higher-performance PGs, a structure and a manufacturing method using a liquid crystal polymer as a material were applied for a patent by Michael J. Escuti (Stichting Dutch Polymer Institutes) et al. (PTL 1).

Furthermore, as an optical beam deflection element using the PGs, an optical beam deflection element illustrated in FIG. 2 has been proposed that is capable of defecting light through a wide angle (PTL 2).

The light deflection element includes a stack of LC half-waveplates and passive PGs.

Basically, the crystals used for the conventional birefringent prism steering illustrated in FIG. 1 are replaced with PGs, and sets of an isotropic medium and a liquid crystal half-wave plate capable of switching the state of a half-wave plate are stacked; the set of the isotropic crystal and the liquid crystal half-wave plate is a type of polarization switch.

Thus, an element has been provided that is capable of steering optical beams through an angle of ±15°.

In recent years, much effort has been made to put to practical use a car capable of avoiding collisions and autonomous driving.

In places such as intersections that have many blind spots, it is necessary to accurately and immediately recognize human beings, obstacles, traffic lights, lanes, motorable areas, and the like and, after determination, appropriately operate the car (FIG. 14).

Thus, very quickly detecting and processing the distance to or the shape, color, or speed of a human being or an object is important.

Thus, a laser radar is desirably capable of simultaneously and independently scanning many optical beams with different wavelengths and adjusting a divergence angle of each optical beam.

However, a steering element including the conventional PGs fails to satisfy the above-described requirements and is very difficult to apply to autonomous driving.

CITATION LIST

Patent Literature

PTL 1: U.S. Pat. No. 7,692,759 B2, Polarization gratings in mesogenic films
PTL 2: U.S. Pat. No. 8,987,313 B2, BEAM STEERING DEVICES INCLUDING STACKED LIQUID CRYSTAL POLARIZATION GRATINGS AND RELATED METHODS OF OPERATION PT

Non-Patent Literature

NPL 1: Optical Fiber Telecommunications IVA, Chapter 18, p 720, Academic press
NPL 2: Achromatic combination of birefringent Plates, S. Pancharatnam, Proc. Indian Acad. Sci. (1955)

SUMMARY OF INVENTION

Technical Problem

Thus, the purpose of the present invention is to accomplish the following objects, which are indispensable for putting to practical use a car capable of avoiding collisions and more advanced autonomous driving, and to provide a reliable optical beam deflection element that can simultaneously and independently deflect many optical beams with various wavelengths through a wide angle and at a very high speed and that is stable at an ambient temperature.

(1) The conventional Polarization Gratings (PGs) all have a "periodic uniaxial birefringence pattern" and are thus uniform. However, a required steering element infrequently uses a single optical beam, and needs to independently operate many optical beams at a time within various angular ranges and at various angular steps.

(2) Furthermore, instead of the same wavelength, many slightly different wavelengths are used.

A deflection angle is determined by the wavelength and a period, and thus, the period needs to be varied according to the wavelength in order to obtain the desired deflection angle.

(3) A µ-second high-speed switch is needed that fails to be realized using a conventional nematic liquid crystal.

(4) For realization of a µ-second high-speed switch, simultaneously driving voltages applied to different electrodes without delay is important, and a control technique is needed.

(5) For practical realization, temperature control is indispensable because liquid crystals have birefringent temperature characteristics.

(6) Furthermore, for practical realization, hermetic sealing is needed to achieve high reliability because liquid crystals are degraded at high temperature and humidity.

Solution to Problem

The present invention provide the following means to accomplish the above-described objects.

(1) An optical beam deflection element including a phase panel controlling a phase of light (polarization) and a polarization grating plate causing birefringence based on the phase of light (polarization), wherein the phase panel includes an electrode, operates as a substantially isotropic medium in a case where no voltage is applied to the electrode, and operates as a half-wave plate at a wavelength used in a case where a voltage is applied to the electrode, the polarization grating plate includes a plurality of plate segments provided in a plane of the polarization grating plate and each plate segment consists of birefringent media with a thickness of a half-wave plate at the wavelength used, each of the plate segments is rectangular or circular and has a birefringence axis rotating with a predetermined period A that is not uniform within the plane of the polarization grating plate, and one or both of the period and a rotating direction of the birefringence axis varies among the plate segments, and the phase panel and the polarization grating plate being joined together in such a manner as to overlap.

The optical beam deflection element includes the phase panel joined to the polarization grating plate including the segments with the varying A.

(2) The optical beam deflection element according to (1), wherein the phase panel is divided into a plurality of panel segments each including an electrode, and each of the panel segments is a phase panel configured to have planar dimensions substantially identical to planar dimensions of each of the plate segments and to overlap the plate segment.

Like the polarization grating plate, the phase panel is an optical beam deflection element having a segment structure.

(3) The optical beam deflection element according to (1) or (2), wherein the phase panel or a phase panel including the panel segments into which the phase panel is divided includes two substrates with the electrode being formed into a corrugated sheet-like thin film on a corrugated sheet-like surface including recessed components and protruding components, and a polymer-stabilized blue phase liquid crystal, the polymer-stabilized blue phase liquid crystal is inserted between the corrugated sheet-like thin films formed on the two substrates disposed opposite to each other with a predetermined distance between the substrates in a staggered manner such that each of the protruding components of the corrugation of one of the substrates lies opposite to the recessed components that are included in the corrugation of the other of the substrates and that are adjacent to each other, each of the corrugated sheet-like thin films is formed of a material that is transparent at an optical wavelength used, the polymer-stabilized blue phase liquid crystal is stabilized by irradiation with light, and the polymer-stabilized blue phase liquid crystal is a phase panel capable of applying a positive voltage and a negative voltage to the electrodes formed into the thin films on the substrates.

In the optical beam deflection element including the polymer-stabilized blue phase liquid crystal, the phase panel has a zigzag structure with a recessed and protruding shape, and voltages are applied to the opposite electrodes in an up-down direction.

(4) The optical beam deflection element according to (3), wherein the recessed and protruding components of the phase panel are shaped generally like triangles or trapezoids, and an angle between oblique sides of the protruding components ranges from 30° to 80°.

(5) The optical beam deflection element according to (1) or (2), wherein the phase panel or a phase panel including the panel segments into which the phase panel is divided includes two substrates with the electrode being formed into a corrugated sheet-like thin film on a corrugated sheet-like surface including recessed components and protruding components, and a polymer-stabilized blue phase liquid crystal, the polymer-stabilized blue phase liquid crystal is inserted between the recessed components and protruding components of the two substrates disposed opposite to each other such that the electrodes of the protruding components of one of the substrates lie opposite to valley components each between the electrodes formed on the adjacent protruding components of the other of the substrates, each of the corrugated sheet-like thin films is formed of a material that is transparent at an optical wavelength used, the polymer-stabilized blue phase liquid crystal is stabilized by irradiation with light, and the polymer-stabilized blue phase liquid crystal is a phase panel capable of applying, in a lateral direction, a positive voltage and a negative voltage to the electrodes of each of the substrates.

In the optical beam deflection element including the polymer-stabilized blue phase liquid crystal, the phase panel has a zigzag structure with opposite recessed and protruding shapes, and voltages are applied laterally using comb-like electrodes.

(6) The optical beam deflection element according to (5), wherein the recessed and protruding components are shaped generally like triangles or trapezoids, and an angle between oblique sides of the protruding components ranges from 100° to 140°.

(7) The optical beam deflection element according to (5), wherein a distance between the adjacent electrodes formed on the protruding components of the corrugation of the substrate is substantially equal to the predetermined distance.

In the optical beam deflection element, the dimensions of the distance between the electrodes of the phase panel and the distance between the com-like electrodes are limited.

(8) The optical beam deflection element according to (3) or (5), wherein a plurality of the phase panels or a plurality of the phase panels each including the panel segments into which the phase panel is divided are stacked in an identical direction to form a multilayer structure such that the protruding components and the recessed components of the substrates of the phase panels adjacent to each other are staggered.

The optical beam deflection element is configured to compensate for an incident light angle for the opposite electrodes and the com-like electrodes.

(9) The optical beam deflection element according to (3) or (5), wherein a difference in refractive index among a material forming the polarization grating plate, and the substrate, the polymer-stabilized blue phase liquid crystal, and the electrodes forming the phase panel or the phase panel including the panel segments into which the phase panel is divided, light passing through the electrodes, is less than or equal to ±10% at the wavelength used.

The optical beam deflection element is configured to inhibit total reflection from the opposite electrodes and comb-like electrodes.

(10) The optical beam deflection element according to (1) to (3) or (5), wherein the phase panel and the polarization grating plate are bonded together using an optical resin having a refractive index that is substantially identical to a refractive index of constituent materials of the phase panel and the polarization grating plate or are directly joined together without any air interposed between the phase panel and the polarization grating plate.

For the optical beam deflection element, the method for joining the phase panel and the polarization grating plate together is limited.

(11) The optical beam deflection element according to (3) or (5), wherein a plurality of the optical beam deflection elements are stuck and stacked together using a resin that has a refractive index substantially identical to a refractive index of the substrate and that is transparent at the wavelength used such that the phase panels or the panel segments overlap one another.

The optical beam deflection elements are stacked and stuck together.

(12) The optical beam deflection element according to (11), wherein the transparent resin has, at the wavelength used, a refractive index of less than or equal to 10% of the refractive index of the substrate material forming the phase panel.

For the optical beam deflection element, the refractive index of the resin used to stick the optical beam deflection elements together is limited.

(13) The optical beam deflection element according to (1) or (2), including a plurality of the polarization grating plates, and wherein
 plate segments of each of the polarization grating plates are disposed on top of one another in such a manner as to correspond to one another,
 the plate segments of one of the polarization grating plates have periods A1 to An,
 other of the polarization grating plates includes plate segments each having a period slightly different from a period of the corresponding plate segment of the one of the polarization grating plates, and plate segments with a birefringence axis that does not rotate, and
 a plurality of the one of the polarization grating plate and a plurality of the other of the polarization grating plates are stuck together to effectively form one composite polarization grating plate, and the composite polarization grating plate is joined to the phase panel.

The composite polarization grating plate includes two polarization grating plates constituting one polarization grating plate.

(14) A method for driving the optical beam deflection element according to (11), wherein each of the electrodes of the phase panel of the optical beam deflection element is driven using, in a predetermined order, a set of rectangular waves reversed between positive and negative and each having a time width of T and an absolute value of V (state "1") and a zero voltage (state "0").

In the method for driving, a set of voltages reversed between positive and negative is applied to the phase panel.

(15) The method for driving the optical beam deflection element according to (14), wherein application to the electrodes of the same phase panel of the stacked optical beam deflection elements or the electrodes of the same panel segment is synchronous.

In the method for driving, the voltage application is synchronous between the phase panels of the stacked optical beam deflection elements.

(16) The method for driving the optical beam deflection element according to (14) or (15), wherein the time width T is smaller than or equal to 1 millimeter second, and the driving voltage reversed between positive and negative has an absolute value larger than or equal to 5 V.

In the method for driving, the time width for the phase panel voltage application is limited.

(17) The method for driving the optical beam deflection element according to (14) or (15), wherein overdriving is performed by setting the absolute voltage value for first several sets of the rectangular waves larger than the absolute voltage value for the subsequent rectangular waves.

In the method for driving, initial overdriving is used for the phase panel voltage application.

(18) The optical beam deflection element according to (3) or (5), wherein a heater layer that is transparent at the wavelength used is formed near the electrodes of the substrate with an insulating film interposed between the heater layer and the electrodes.

In the optical beam deflection element, the heater is used for temperature control.

(19) A optical beam deflection element module wherein
 the optical beam deflection element according to (11) includes two substrates and a Peltier element including a P-type semiconductor and an N-type semiconductor,
 one of the substrates of the Peltier element is joined to the optical beam deflection element,
 a cooling heat sink is connected to other substrate of the Peltier element, and
 the optical beam deflection element is controlled to a predetermined temperature.

In the optical beam deflection element, the Peltier element is used for temperature control.

(20) The optical beam deflection element module according to (19), wherein the P-type semiconductors and the N-type semiconductors of the optical beam deflection element and the Peltier element are housed in a space interposed between transparent window plates for hermetic sealing.

The optical beam deflection element module has a module structure including the Peltier element, and the PN semiconductor components are hermetically sealed.

(21) The optical beam deflection element according to (18), wherein ultraviolet cut filters are attached to a light input surface and a light output surface of the optical beam deflection element.

The optical beam deflection element has a module structure including the Peltier element, and the ultraviolet cut filters are applied to the optical beam deflection element.

(22) The optical beam deflection element module according to (20), wherein an ultraviolet cut filter is attached to each of the window plates.

The optical beam deflection element module has a module structure including the Peltier element, and the ultraviolet cut filters are applied to the optical beam deflection element module.

Advantageous Effects of Invention (1) A µ-second high-speed switch can be provided that independently operates many optical beams at a time within various angular ranges and at various angular steps; the µ-second high-speed switch is difficult to realize using the conventional technique.

(2) A reliable optical beam deflection element module can be realized that operates at various ambient temperatures.

DESCRIPTION OF EMBODIMENTS

Embodiment 1

Figure 1:
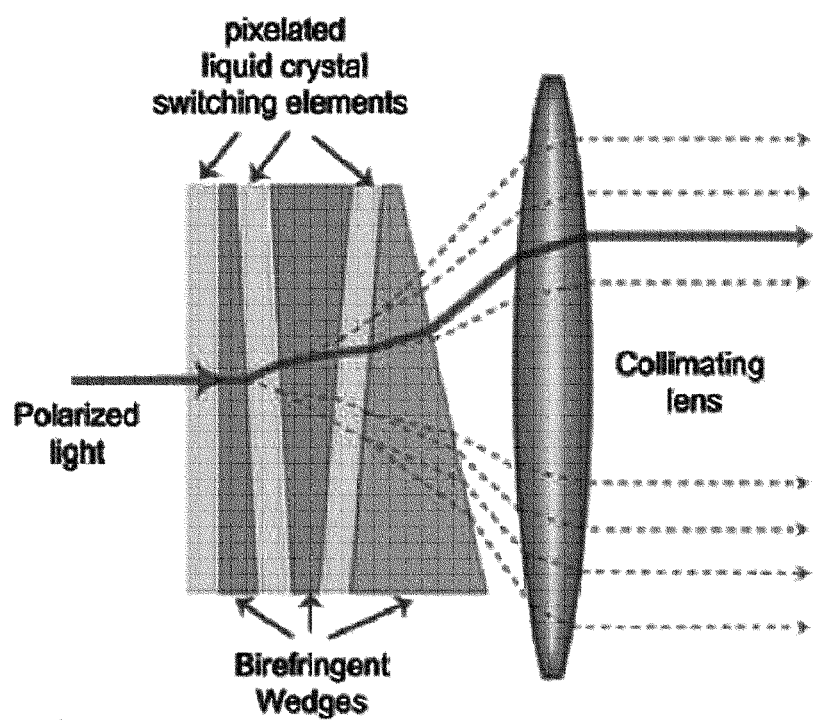
FIG. 1 illustrates birefringent prism steering that is a conventional technique.
Figure 2:
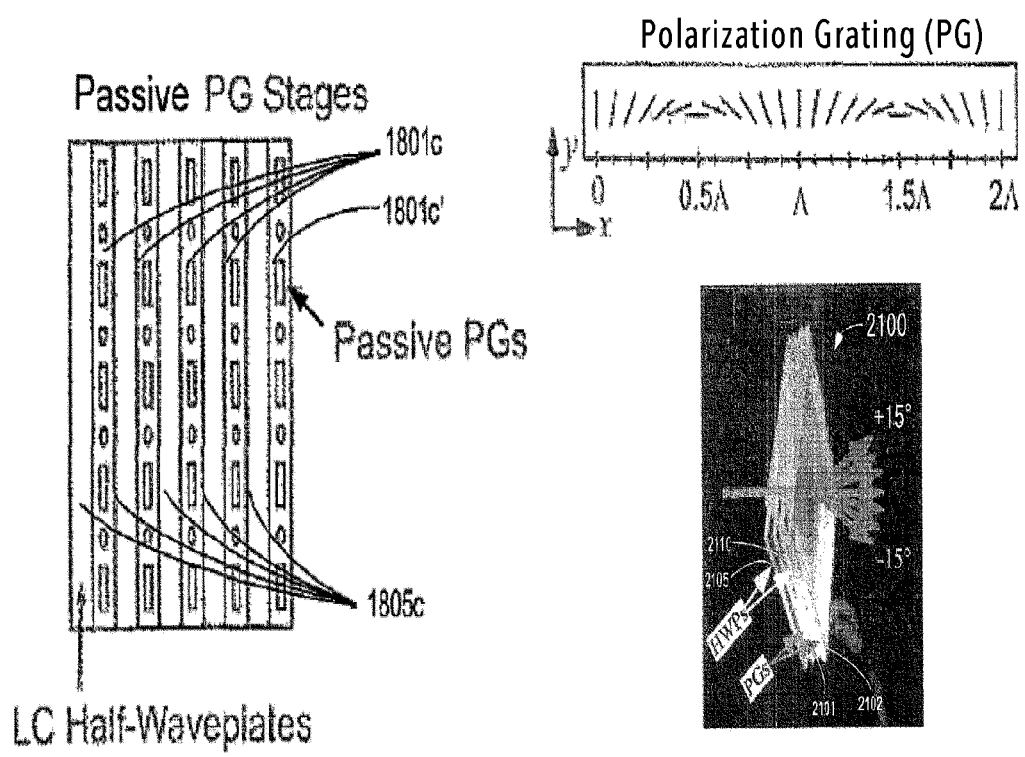
FIG. 2 is a diagram illustrating an optical beam deflection element capable of deflecting optical beams through a wide angle, the optical beam deflection element being a conventional technique.
Figure 3:
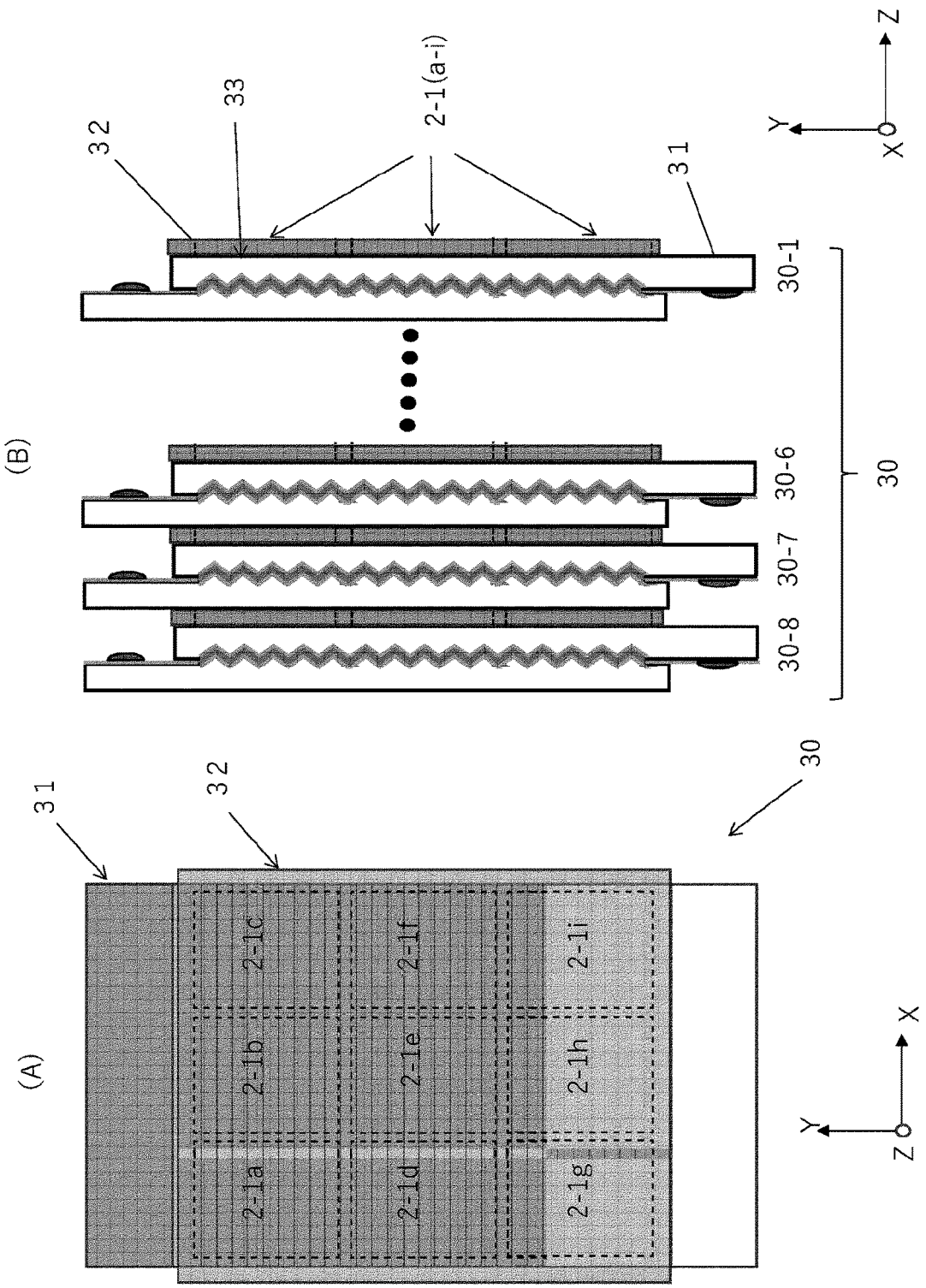
FIG. 3 illustrates a first embodiment of the optical beam deflection element of the present invention.

FIG. 3 illustrates a first embodiment of an optical beam deflection element of the present invention.

FIG. 3(a) is a front view, and FIG. 3(B) is a side view.

In the present embodiment, a case is illustrated where eight optical beam deflection elements 30 (30-1 to 30-8) are used. However, the number of optical beam deflection elements stuck together is optional.

Each of the optical beam deflection elements 30 consists of a half-wave phase plate 31 and a polarization grating plate 32 that are attached together using an optical resin having substantially the same refractive index as that of the half-wave phase plate 31 and the polarization grating plate 32.

The polarization grating plate 32 includes segments 2-1 (a to i) in which various birefringence patterns are formed, and the eight optical beam deflection elements 30 (30-1 to 30-8) are stuck together such that the segments 2-1 (a to i) coincide with one another in a thickness direction (Z direction) of the substrate.

Note that an optical resin 33 used for sticking is a resin having substantially the same refractive index as that of the half-wave phase plate 31 and the polarization grating plate 32.

Figure 4:
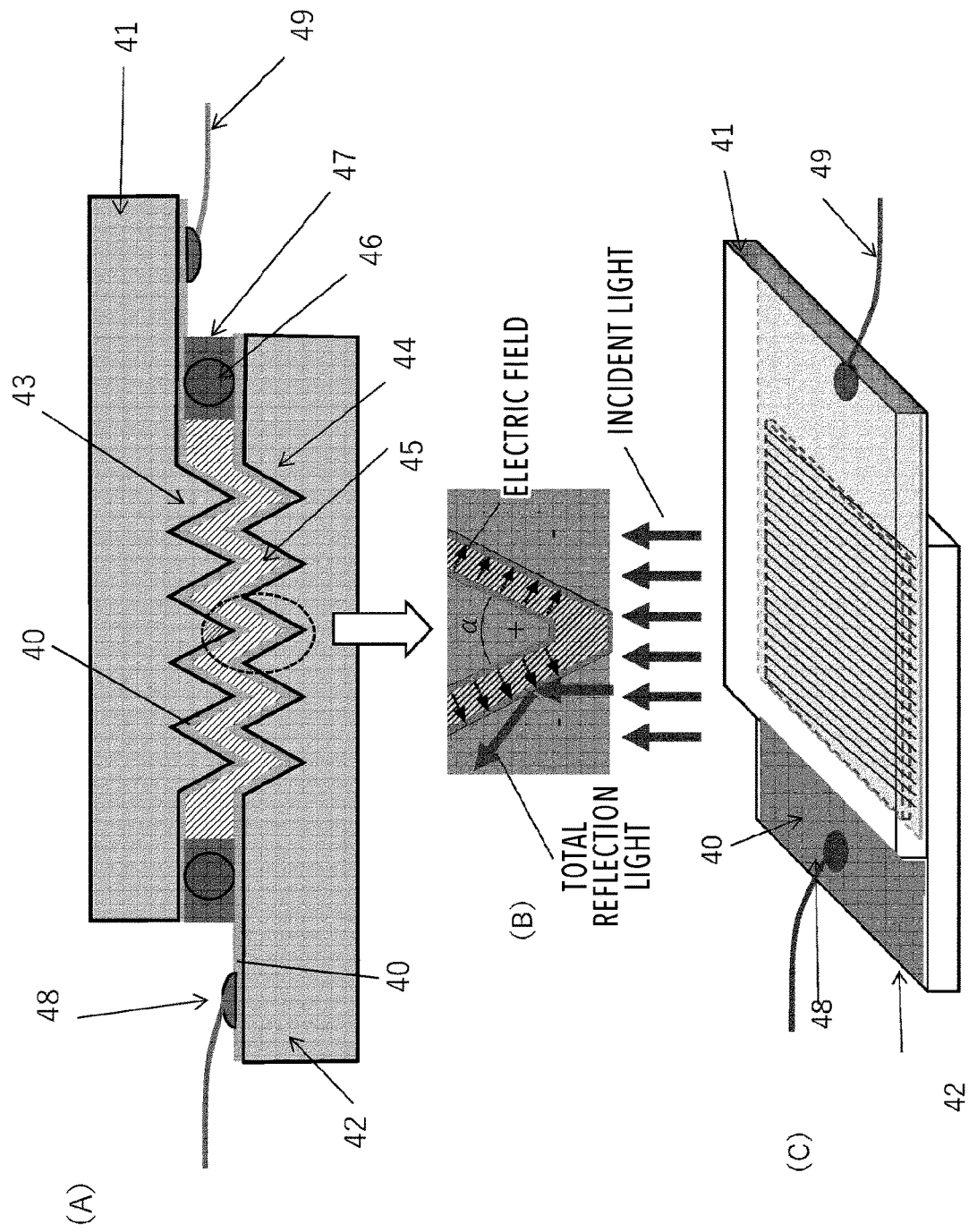
FIG. 4 illustrates an embodiment of a half-wave phase plate constituting the optical beam deflection element of the present invention.

FIG. 4 illustrates an embodiment of the half-wave phase plate 31.

FIG. 4(A) is a cross-sectional view, and FIG. 4(B) is an enlarged view of protruding components 43 and recessed components 44 disposed opposite to one another. FIG. 4(C) is a perspective view.

The protruding components 43 shaped like triangles are formed in an upper substrate 41, and a thin-film electrode 40 that is transparent at a wavelength used is formed on the protruding components 43.

On the other hand, the recessed components 44 shaped like triangles are formed in a lower substrate 42, and the thin-film electrode 40 is formed on the recessed components 44. The shape of the recessed components and protruding components may be a trapezoid instead of the triangle.

Glass or an optical resin is used as a basic material.

Furthermore, the shape of the recessed components and the protruding components can be easily achieved using a mold or a stamper.

ITO or the like can be used as the thin-film electrode 40 that is transparent.

The upper substrate 41 and the lower substrate 42 are disposed such that the protruding components 43 and the recessed components 44 lie opposite to one another via a spacer 46, with a polymer-stabilized blue phase liquid crystal 45 inserted between the protruding components 43 and the recessed components 44.

A sealing agent 47 is formed near the spacer 46 to seal the polymer-stabilized blue phase liquid crystal 45.

A voltage is applied through an electrode wire 49 via an electrode pad 48 formed on the thin-film electrode 40.

A µ-second high-speed switch is impossible to realize using a conventional nematic liquid crystal. Thus, in the present invention, the polymer-stabilized blue phase liquid crystal 45 is used.

A Kerr effect of the polymer-stabilized blue phase liquid crystal 45 is utilized that increases birefringence by a factor of the square of electric fields.

This eliminates a need for an orientation film and rubbing treatment for the orientation film. On the other hand, a voltage needs to be applied in a direction orthogonal to a traveling direction of light, preventing operation of a parallel-plate electrode like the conventional nematic liquid crystal.

In a case where light is incident perpendicularly to a substrate surface, an electric field parallel to the substrate surface needs to be generated.

Thus, importantly, an angle α between oblique sides of triangles and trapezoids ranges from 30 to 90°.

The reason is as follows. A smaller angle α causes the electric field to extend in a lateral direction. Then, birefringence occurs in the lateral direction to allow retardation of incident light to be easily varied. This enables a half-wave operation to be achieved at a low voltage.

However, in a case of such a thin-film electrode with a zigzag structure, an obliquely incident optical beam may be totally reflected by the zigzag surface, leading to significantly degraded efficiency.

For inhibition of total reflection, a boundary may be set to have the same refractive index.

Thus, a difference in refractive index among all materials such as for the phase panel, the polymer-stabilized blue phase liquid crystal, and the electrode constituting the substrate and a material constituting the polarization grating plate was set to less than or equal to ±10% at a wavelength used.

Furthermore, the phase panel and the polarization grating plate were bonded together using an optical resin having substantially the same refractive index as that of the above-described constituent materials or were directly joined together without any air interposed between the phase panel and the polarization grating plate.

Figure 5:
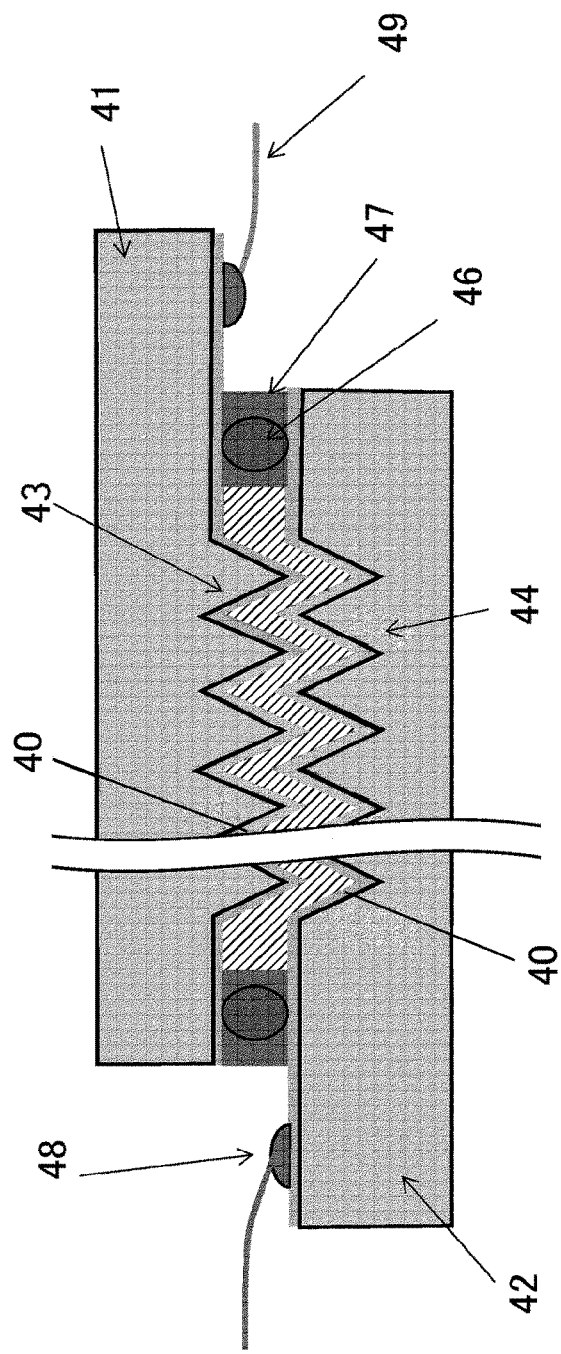
FIG. 5 illustrates an embodiment of a segment structure in which a thin film electrode of the half-wave phase plate constituting the optical beam deflection element of the present invention is divided into segments.
Figure 5:
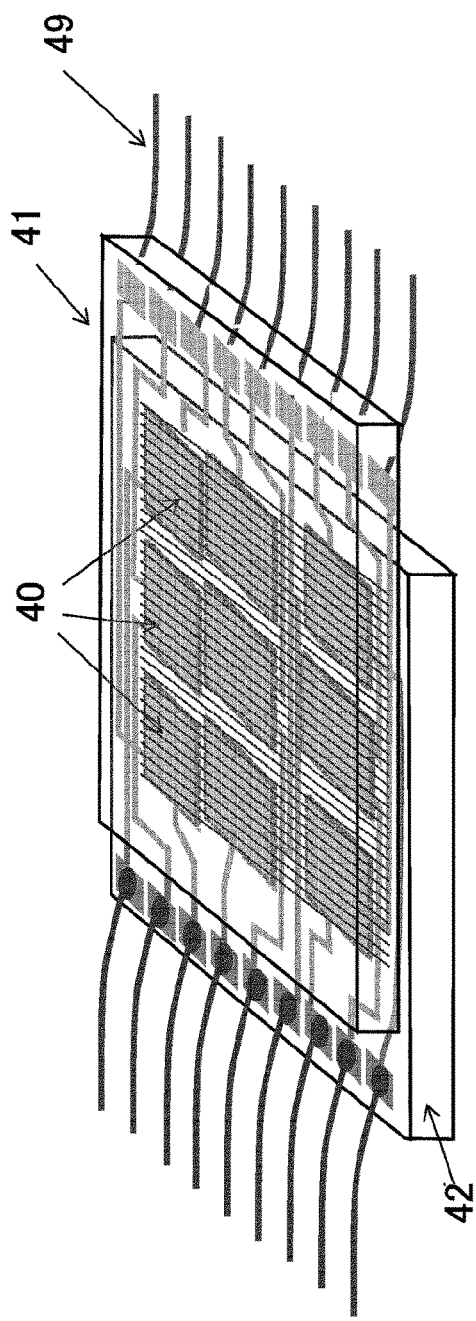

FIG. 5 illustrates a case of a segment structure in which the thin-film electrode is divided.

In this example, nine segmented thin-film electrodes 40 are formed and voltages can be independently applied to the respective thin-film electrodes 40.

Figure 6:
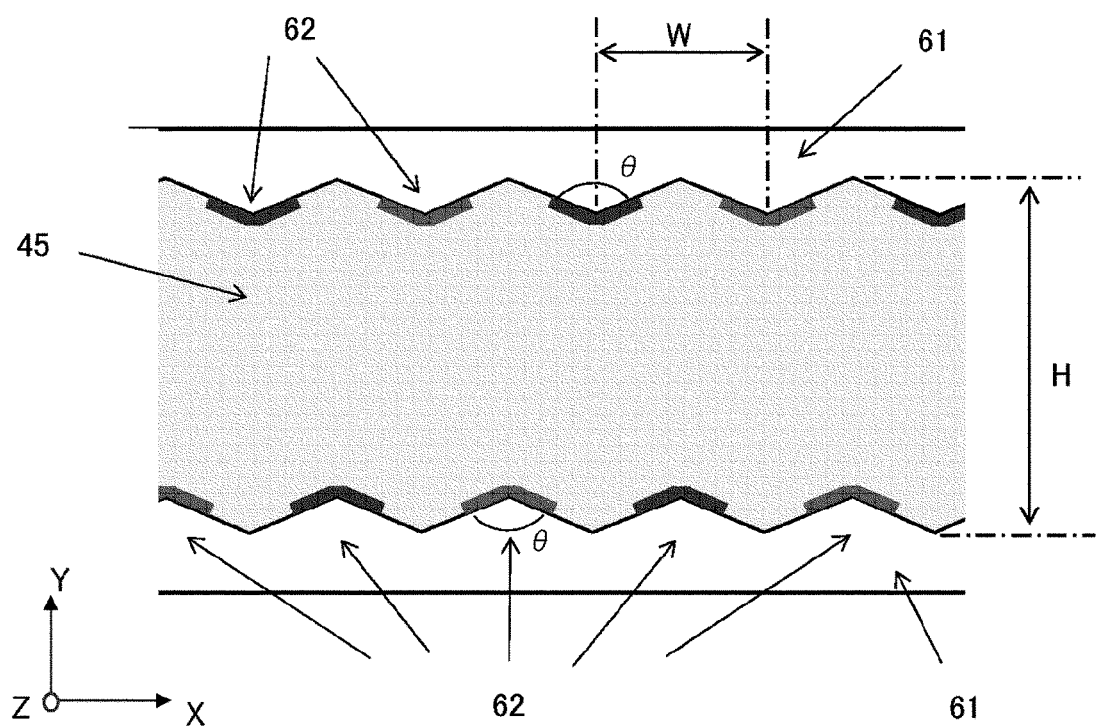
FIG. 6 illustrates an embodiment of another half-wave phase plate.

FIG. 6 illustrates an embodiment of another half-wave phase plate 31.

Two substrates 61 are used and each include recesses and protrusions formed on one of a substrate 61 and transparent thin-film electrodes 62 each formed on a slope of the corresponding recess and protrusion near a peak of the recess and the protrusion. The comb-like thin-film electrodes 62 are disposed opposite to one another across a desired gap H in a staggered manner.

The polymer-stabilized blue phase liquid crystal 45 is inserted between the thin-film electrodes 62 of the respective substrates and irradiated with light for stabilization. Note that an angle θ between oblique sides of the protruding component ranges from 90° to 140°.

Figure 14:
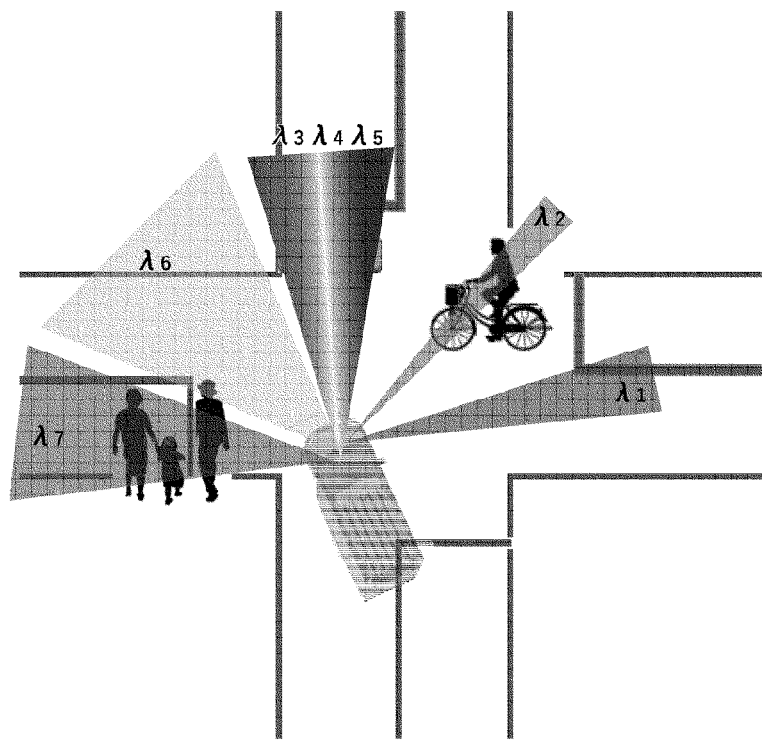
FIG. 14 is a schematic diagram of a multi-laser radar used for car driving control.

FIG. 14 is a diagram of a comparison between a structure of a conventional planarly formed comb-like electrode (A-1) and an electric-field distribution (A-2) of the comb-like electrode and the structure of the present invention (B-1) and an electric-field distribution (B-2) of the structure of the present invention.

In both structures, an electrode distance W is set to 10 μm, and the gap H is set to 10 μm.

The figure indicates that more electric fields (indicated by small arrows) are distributed (controlled) in the lateral direction in the present invention than in the conventional example. Note that θ in this case is 120°.

Figure 15:
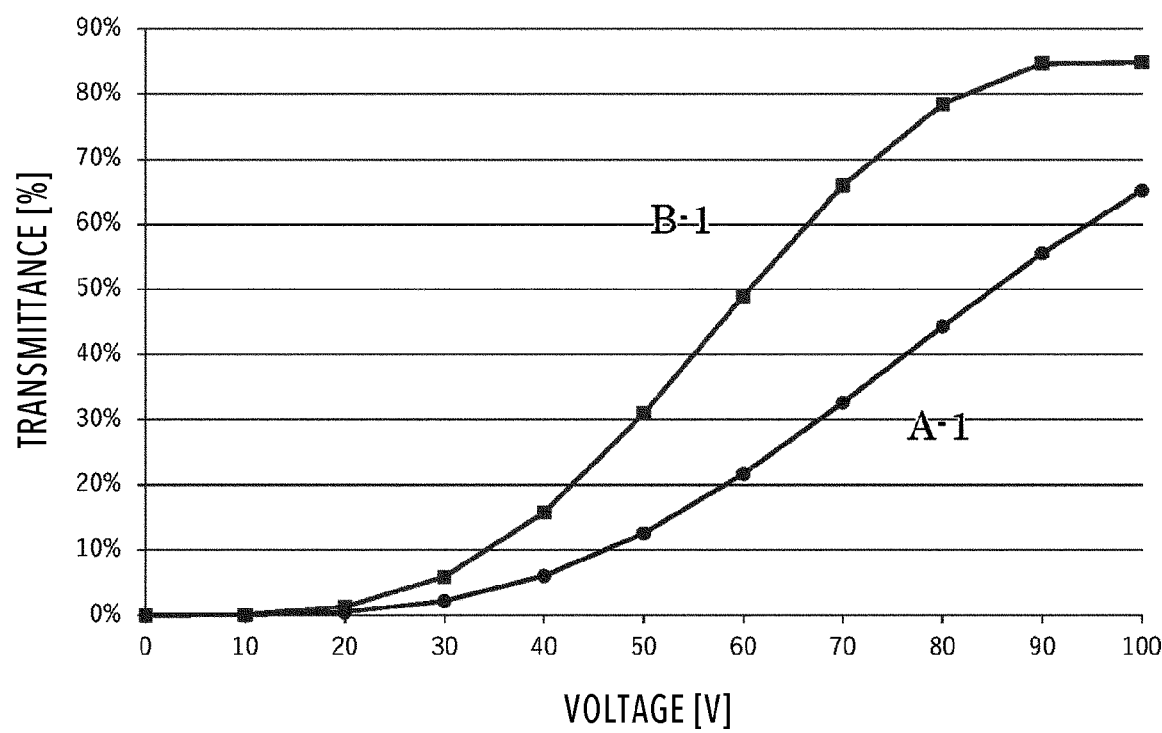
FIG. 15 is a diagram illustrating a relationship between transmittance and applied voltage for the structure of the conventional planarly formed comb-like electrode (A-1) and the structure of the present invention (B-1).

FIG. 15 illustrates a relationship between transmittance and applied voltage for the structure of the conventional planarly formed comb-like electrode (A-1) and the structure of the present invention (B-1).

Note that the transmittance is indicative of standardized transmission in a case where the half-wave phase plate 31 is inserted between two polarizers disposed in a crossed Nicol state. The figure indicates that the structure of the present invention (B-1) achieves a higher transmittance at a lower voltage than the structure of the conventional planarly formed comb-like electrode.

Figure 16:
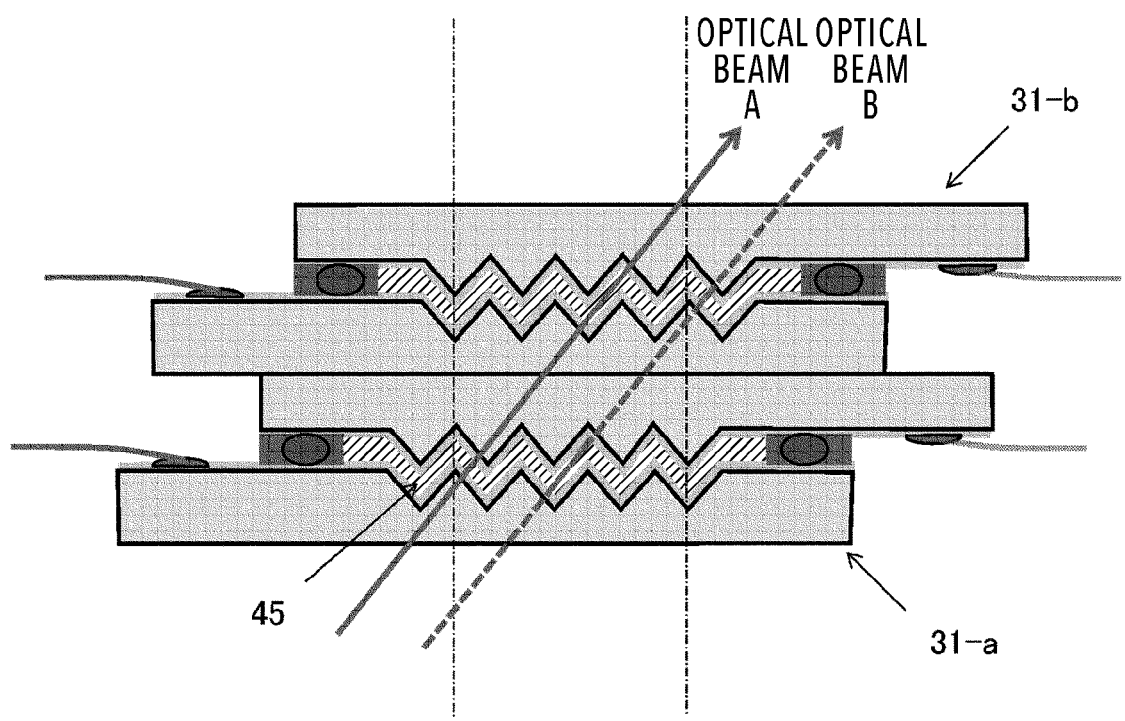
FIG. 16 is a cross-sectional view illustrating an embodiment of a half-wave phase plate 31.

FIG. 16 illustrates an embodiment of another half-wave phase plate 31.

Here, two half-wave phase plates 31-a, 31-b are used and joined together such that the protruding components of one of the plates lie opposite to the recessed components of the other plate.

In this configuration, in a case of passing through the polymer-stabilized blue phase liquid crystal 45, obliquely incident light, for example, an optical beam A travels a short distance in the half-wave phase plate 31-a but a long distance in the half-wave phase plate 31-b, and thus the half-wave phase plates 31-a and 31-b compensate for each other.

Furthermore, in a case of passing through the polymer-stabilized blue phase liquid crystal 45, an optical beam B travels a long distance in the half-wave phase plate 31-a but a short distance in the half-wave phase plate 31-b, and thus the half-wave phase plates 31-a and 31-b compensate for each other.

In this manner, for substantially all the angles of incident optical beams, substantially the same distance of passage through the polymer-stabilized blue phase liquid crystal 45 can be achieved.

Figure 7:
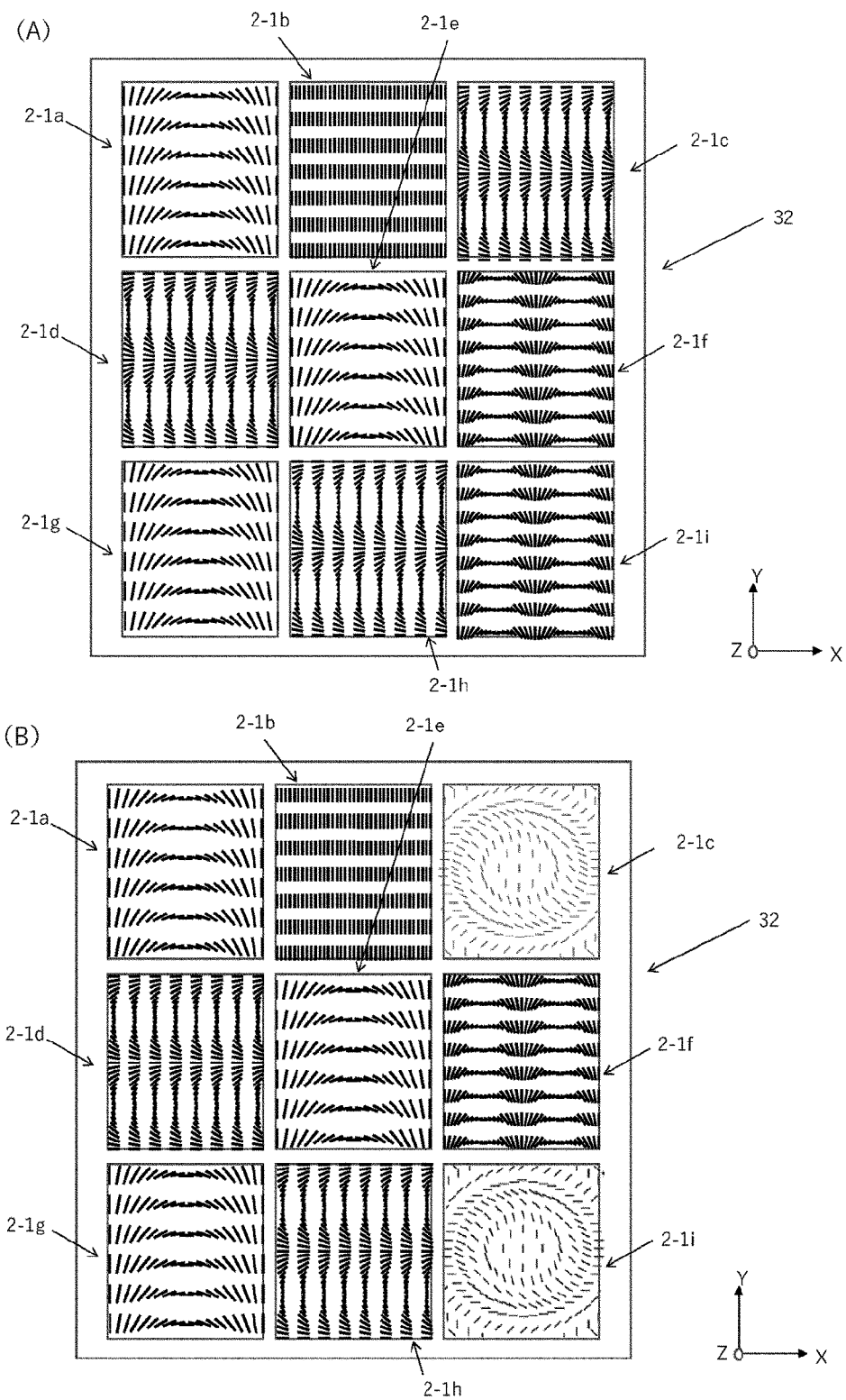
FIG. 7(A) illustrates an embodiment of a polarization grating plate, and (B) illustrates another embodiment of the polarization grating plate.

FIG. 7(A) illustrates an embodiment of the polarization grating plate 32.

The polarization grating plate 32 is constituted of a birefringent medium with a thickness that is equal to half the wavelength used.

As a material, a photonic crystal may be used that is a liquid crystal polymer, glass, or silicon provided with recesses and protrusions on a surface thereof, the recesses and protrusions being smaller than the wavelength.

In the segment 2-1 (a to i) structure, a birefringence axis rotates with a certain period Λ, but the period is not uniform within the plane and varies substantially in a step-by-step manner.

In the present embodiment, a segment 2-1f varies in a step-by-step manner in an X-axis direction with a period Λ half the period of a segment 2-1a. Moreover, in a segment 2-1c, the birefringence axis rotates in a Y-axis direction.

FIG. 7(B) illustrates another embodiment of the polarization grating plate 32.

In this case, the birefringent axes in a segment 2-c and a segment 2-1i have not only a different period Λ but also a different rotating direction.

Figure 8:
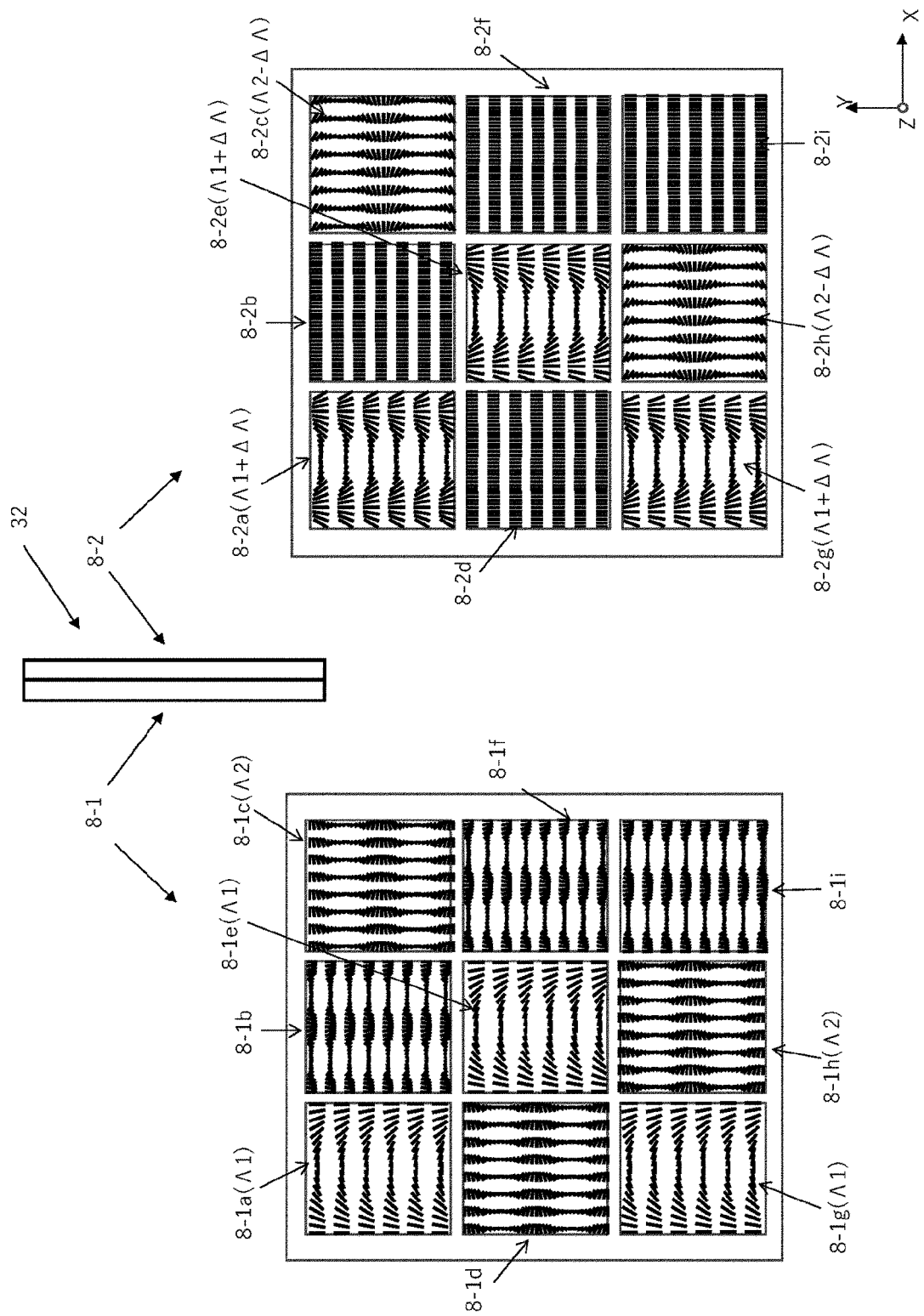
FIG. 8 illustrates another embodiment of the polarization grating plate.

FIG. 8 illustrates another embodiment of the polarization grating plate 32.

The polarization grating plate 32 include a polarization grating plate 8-1 and a polarization grating plate 8-2 stuck together.

The birefringent axes in some of the segments (for example, 8-2b, 8-2d, 8-2f, 8-2i) of the polarization grating plate 8-2 do not rotate and face in a constant direction.

Furthermore, certain segments involve a period (Λ±ΔΛ) slightly different from the period in another polarization grating plate 8-1 and a rotating direction opposite to the rotating direction in the polarization grating plate 8-1 in the up-down direction.

Sticking the polarization grating plate together allows a very small period ΔΛ to be effectively achieved in certain segments.

In general, a small period ΔΛ is difficult to achieve due to fluctuation during the process. However, the present method enables such a period to be relatively easily achieved.

Note that, in contrast, for a large period ΔΛ, the polarization grating plates may be stuck together without reversal of the rotating direction of the birefringence axis in the polarization grating plate 8-1 in the up-down direction.

The optical beam deflection element as described above exhibits temperature dependency depending on a change in the birefringence of the polymer-stabilized blue phase liquid crystal due to temperature.

Thus, temperature control is needed for practical application.

Figure 9:
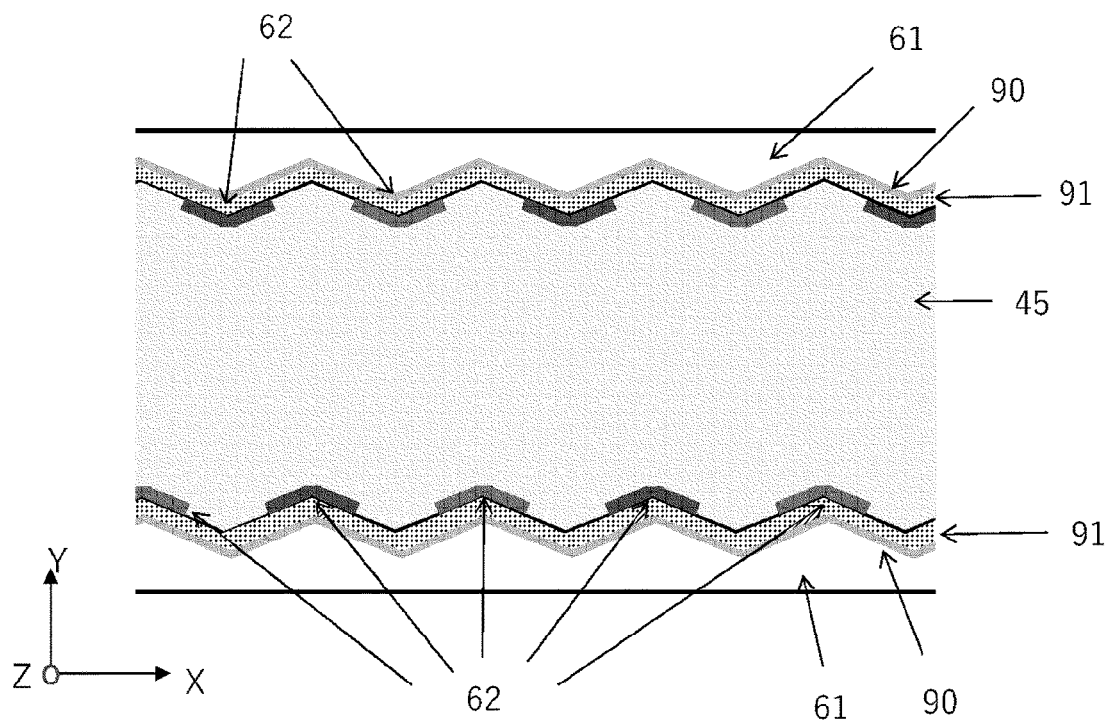
FIG. 9 illustrates a structure of a phase panel with a heater.

FIG. 9 illustrates a structure of a phase panel with a heater.

A heater 90 produced from a transparent electrode is mounted all over the surface of the substrate 61, and an insulating film 91 is formed on the heater 90.

The heater 90 is disposed near the transparent thin-film electrode 62 with the insulating film 91 interposed between the heater 90 and the thin-film electrode 62, the insulating film 91 having a thickness of approximately several tens of μm. Thus, the temperature of the polymer-stabilized blue phase liquid crystal 45 can be efficiently increased, and the temperature can be raised to a desired value in a short time.

Note that ITO or the like can be used as a material for the heater 90.

Figure 10:
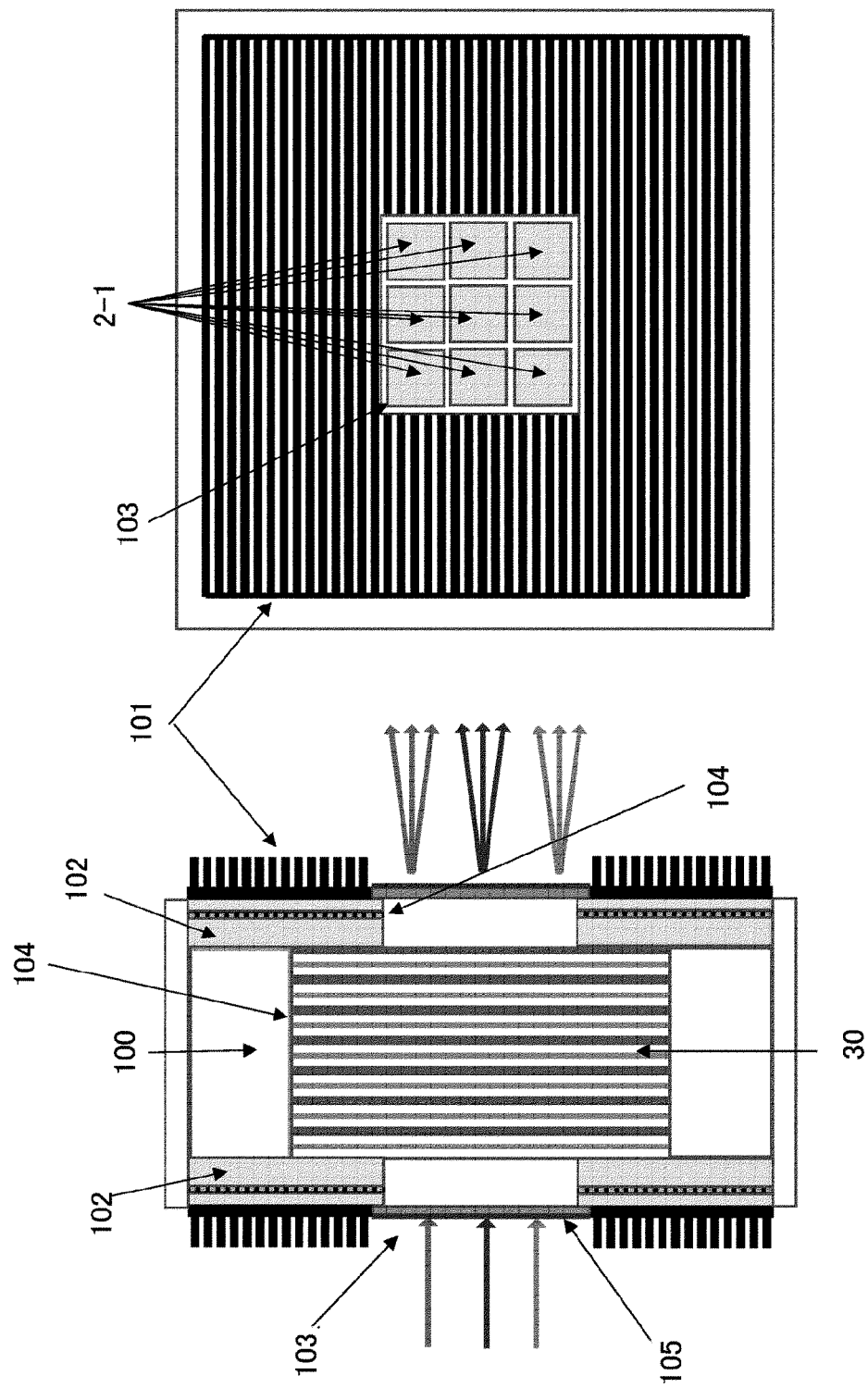
FIG. 10 illustrates an embodiment of an optical beam deflection element module of the present invention including a Peltier element.

FIG. 10 illustrates an embodiment of an optical beam deflection element module of the present invention including a Peltier element.

The optical beam deflection element 30 is enclosed by a hermetic sealing block 100 and bonded to the hermetic sealing block 100 at a boundary surface 104 using a sealing resin.

A partial surface of the optical beam deflection element 30 is attached to one surface of a Peltier element 102, and a radiating fin 101 is disposed on the other surface of the Peltier element 102.

The optical beam deflection element 30 may be an optical beam deflection element 30 with a heater.

Light is input and output through a window 103.

In this embodiment, the window 103 contains nine segments on which optical beams with slightly different wavelengths are allowed to be incident. The optical beams can thus be independently deflected.

In this example, a glass plate is attached to the window. However, the glass plate need not necessarily be provided.

Furthermore, an ultraviolet cut filter 105 is formed on the glass plate or an input surface and an output surface of the optical beam deflection element 30 to allow suppression of degradation of the polymer-stabilized blue phase liquid crystal caused by ultraviolet rays from the outside world.

Furthermore, a PN junction component between the optical beam deflection element 30 and the Peltier element 102 is disposed in the window 103 for hermetic sealing to allow provision of a reliable optical beam deflection element module prevented from failing even in a hot and humid atmosphere.

Figure 11:
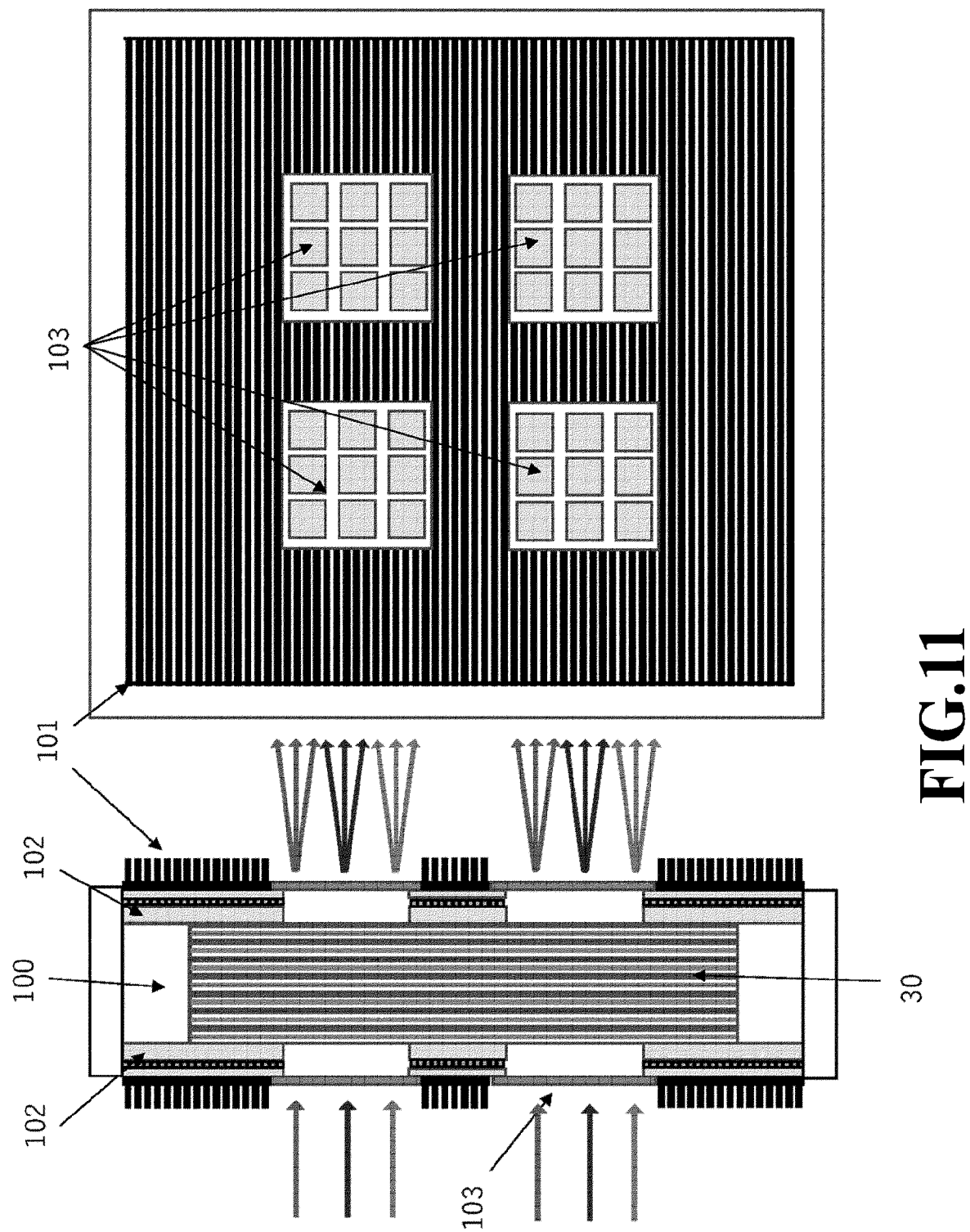
FIG. 11 illustrates another embodiment of the optical beam deflection element module of the present invention including the Peltier element.

FIG. 11 illustrates another embodiment of the optical beam deflection element module of the present invention. In this example, four windows 103 are formed, and nine segments are formed in each of the windows 103. A total of 36 optical beams can be independently deflected.

Figure 12:
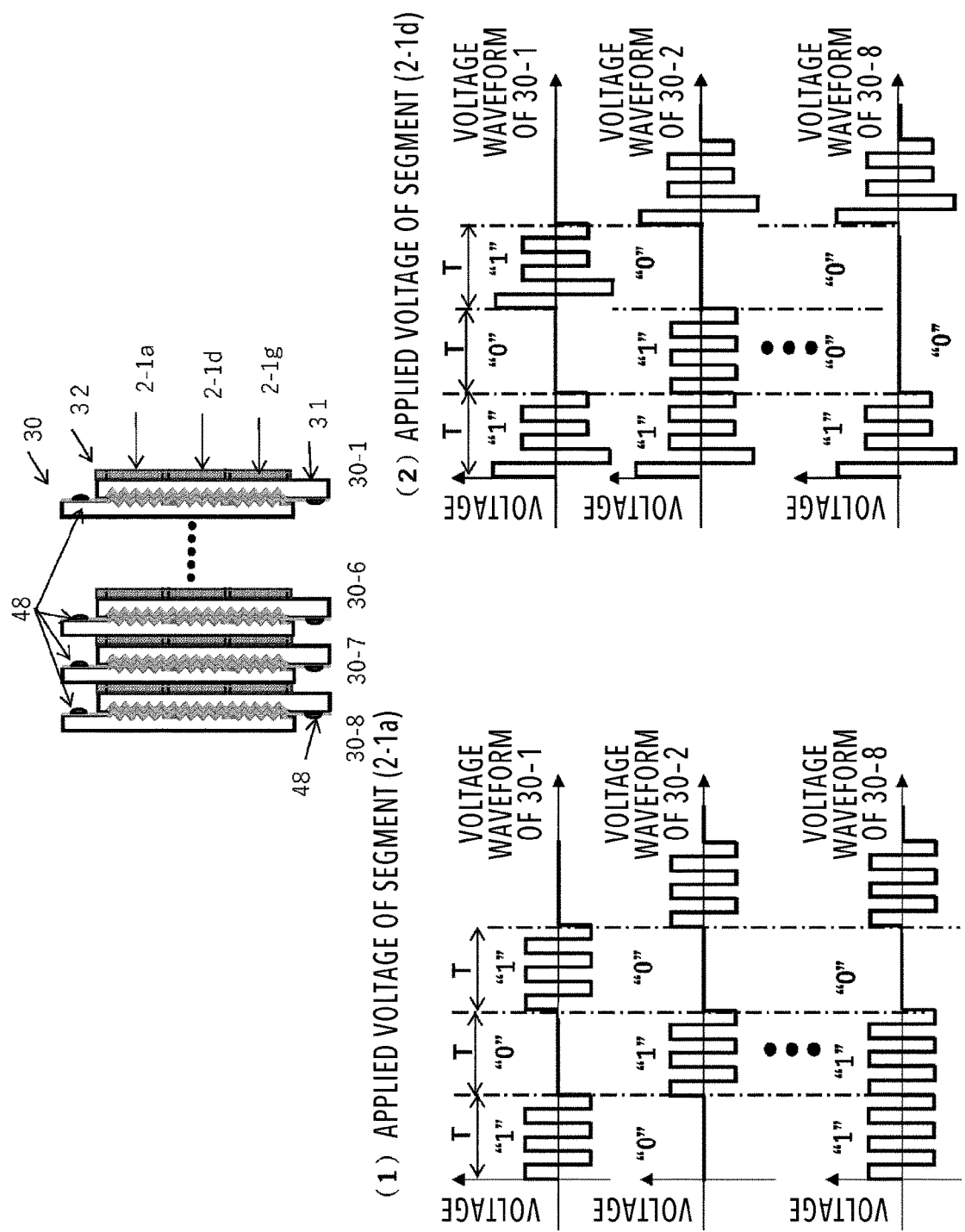
FIG. 12 illustrates an embodiment of an optical beam deflection element module driving method of the present invention.
Figure 13:
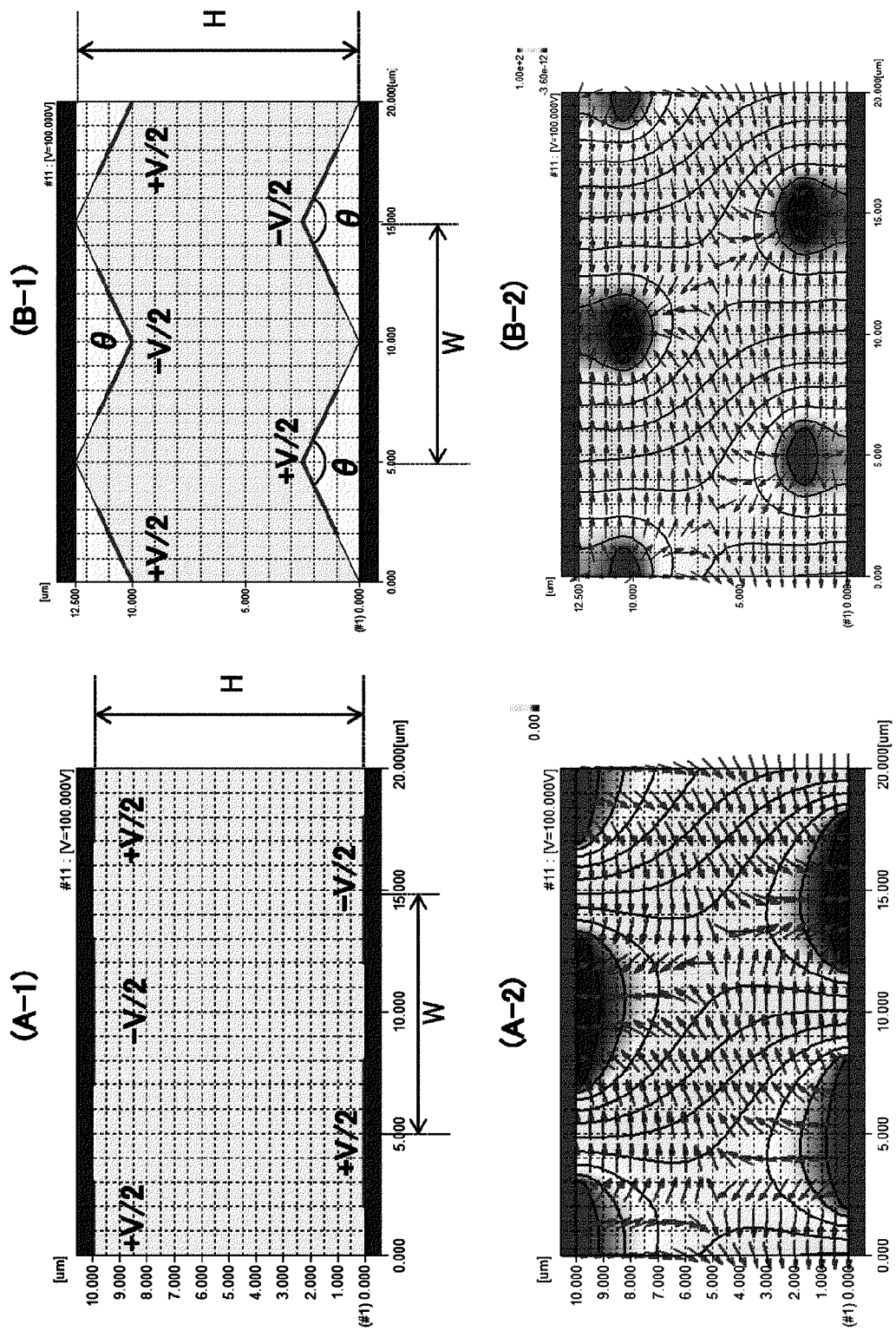
FIG. 13 is a diagram of a comparison between a structure of a conventional planarly formed comb-like electrode A-1 and an electric-field distribution A-2 of the comb-like electrode and the structure of the present invention B-1 and an electric-field distribution B-2 of the structure of the present invention.

FIG. 12 illustrates an embodiment of an optical beam deflection element module driving method of the present invention.

The electrodes of the phase panel of the optical beam deflection element 30 are driven by a set of rectangular waves reversed between positive and negative and having an absolute value of V.

FIG. 12(1) illustrates a voltage applied to a segment (2-1a), and FIG. 12(2) illustrates a voltage applied to a segment (2-1d).

In the present embodiment, a state has a time width T of 60 μs. Driving is performed using a state "1" represented by three sets of rectangular waves with the voltage reversed between positive and negative (absolute value of 20 V), and a state "0" represented by application of no voltage.

Signals of the state "1" and the state "0" with the time width T are substantially synchronous in each segment (for example, 2-1a) in a stacking direction of stacked optical beam deflection elements (30-1, 30-2, 30-3, . . . , 30-8).

In a case of a segment (2-1d) in (2), the first set of rectangular waves in the state "1" has a larger absolute value than the other rectangular waves.

This enables a reduction in start-up time of the switch, allowing quick switching to be achieved.

Note that, in the present embodiment, only the first set of rectangular waves has a higher voltage but that the absolute voltage value of rectangular waves may also be increased for the second set of rectangular waves.

INDUSTRIAL APPLICABILITY

The present invention is particularly suitable as an optical beam deflection element applied to a multi-laser radar intended to put to practical use a car capable of avoiding collisions and more advanced autonomous driving. The present invention is applicable to a communication device and a laser device requiring a μ-second high-speed switch independently operating many optical beams at a time within various angular ranges and at various angular steps.

REFERENCE SIGNS LIST 2-1(a-i): Segment
8-1: #1PG (Polarization grating plate) (#1PG Segment)
8-2: #2PG (Polarization grating plate) (#2PG Segment)
8-1(a-i): #1PG Segment
8-2(a-i): #2PG Segment
30(30-1 to 30-8): Optical beam deflection element
31, 31-a, 31-b: Half-wave phase plate
32: Polarization grating plate (PG)
33: Optical resin
40: Thin-film electrode
41: Upper substrate
42: Lower substrate
43: Protruding component
44: Recessed component
45: Polymer-stabilized blue phase liquid crystal
46: Spacer
47: Sealing agent
48: Electrode pad
49: Electrode wire
61: Substrate
62: Comb-like thin-film electrode
90: Heater
91: Insulating film
100: Hermetic sealing block
101: Radiating fin
102: Peltier element
103: Window (Window plate)
104: Boundary surface
105: Ultraviolet cut filter

The invention claimed is:

1. An optical beam deflection element including a phase panel controlling polarization and a polarization grating plate causing birefringence based on the polarization, wherein
the phase panel includes two substrates, each having a corrugated sheet-like surface including recessed components and protruding components, and a polymer-stabilized blue phase liquid crystal inserted between the corrugated sheet-like surface of each of the two substrates disposed opposite to each other with a predetermined distance between the substrates, electrodes are formed into a corrugated sheet-like thin film on the corrugated sheet-like surface of each substrate such that a positive voltage and a negative voltage can be applied to the electrodes by the blue phase liquid crystal, and the two substrates are disposed such that each of the protruding components of one of the substrates lies opposite to the recessed components that are included in the other the substrates and that are adjacent to each other, or electrodes are formed into the corrugated sheet-like films on each protruding component of the corrugated sheet-like surfaces such that a positive voltage and a negative voltage can be applied to the electrode of each of the substrates by the blue phase liquid crystal in a lateral direction and the two substrates are disposed such that the electrodes of the protruding components of one of the two substrates lie opposite to valley components each between the electrodes formed on the protruding components of the other of the two substrates, the phase panel operates as a substantially isotropic medium in a case where no voltage is applied to the electrode, and operates as a half-wave plate at a wavelength used in a case where a voltage is applied to the electrodes, the corrugated sheet-like thin film is formed of a material that is transparent at an optical wavelength used, the polymer-stabilized blue phase liquid crystal is stabilized by irradiation with light, the polarization grating plate includes a plurality of plate segments provided in a plane of the polarization grating plate and each plate segment consists of birefringent media with a thickness of a half-wave plate at the wavelength used, each of the plate segments is rectangular or circular and has a birefringence axis rotating with a predetermined period A that is not uniform within the plane of the polarization grating plate, and one or both of the period and a rotating direction of the birefringence axis varies among the plate segments, and the phase panel and the polarization grating plate is joined together in such a manner as to overlap.

2. The optical beam deflection element according to claim 1, wherein the phase panel is divided into a plurality of panel segments each including an electrode, and each of the panel segments is a phase panel configured to have planar dimensions substantially identical to planar dimensions of each of the plate segments and to overlap the plate segment.

3. The optical beam deflection element according to claim 2, wherein a plurality of the phase panels or a plurality of the phase panels each including the panel segments into which the phase panel is divided are stacked in an identical direction to form a multilayer structure such that the protruding components and the recessed components of the substrates of the phase panels adjacent to each other are staggered.

4. The optical beam deflection element according to claim 2, wherein a difference in refractive index among a material forming the polarization grating plate, and the substrate, the polymer-stabilized blue phase liquid crystal, and the electrodes forming the phase panel or the phase panel including the panel segments into which the phase panel is divided, light passing through the electrodes, is less than or equal to ±10% at the wavelength used.

5. The optical beam deflection element according to claim 2, wherein a plurality of the optical beam deflection elements are stuck and stacked together using a resin that has a refractive index substantially identical to a refractive index of the substrate and that is transparent at the wavelength used such that the phase panels or the panel segments overlap one another.

6. The optical beam deflection element according to claim 5, wherein the transparent resin has, at the wavelength used, a refractive index of less than or equal to 10% of the refractive index of the substrate material forming the phase panel.

7. The optical beam deflection element according to claim 1, wherein the recessed and protruding components of the phase panel are shaped generally like triangles or trapezoids, an angle between oblique sides of the protruding components ranges from 30° to 80° in case the electrodes are formed on the corrugated sheet-like surface, or from 100° to 140° in case the electrodes are formed on each protruding component of the corrugated sheet-like surface.

8. The optical beam deflection element according to claim 1, wherein a distance between the adjacent electrodes formed on the protruding components of the corrugated sheet-like surface of each substrate is substantially equal to the predetermined distance.

9. The optical beam deflection element according to claim 1, wherein the phase panel and the polarization grating plate are bonded together using an optical resin having a refractive index that is substantially identical to a refractive index of constituent materials of the phase panel and the polarization grating plate or are directly joined together without any air interposed between the phase panel and the polarization grating plate.

10. The optical beam deflection element according to claim 1, comprising a plurality of the polarization grating plates, and wherein plate segments of each of the polarization grating plates are disposed on top of one another in such a manner as to correspond to one another, the plate segments of one of the polarization grating plates have periods $\wedge 1$ to $\wedge n$, other of the polarization grating plates includes plate segments each having a period slightly different from a period corresponding plate segment of the one of the polarization grating plates, and plate segments with a birefringence axis that does not rotate, and a plurality of the one of the polarization grating plate and a plurality of the other of the polarization grating plates are stuck together to effectively form one composite polarization grating plate, and the composite polarization grating plate is joined to the phase panel.

11. The optical beam deflection element according to claim 1, wherein a heater layer that is transparent at the wavelength used is formed near the electrodes of the substrate with an insulating film interposed between the heater layer and the electrodes.

12. The optical beam deflection element according to claim 11, wherein ultraviolet cut filters are attached to a light input surface and a light output surface of the optical beam deflection element.

13. A method for driving optical beam deflection comprising:

providing an optical beam deflection element comprising:

a phase panel controlling a polarization and a polarization grating plate causing birefringence based on the polarization, wherein:
  the phase panel includes two substrates, each having a corrugated sheet-like surface including recessed components and protruding components, and a polymer-stabilized blue phase liquid crystal inserted between the corrugated sheet-like surface of each of the two substrates disposed opposite to each other with a predetermined distance between the substrates,
  electrodes are formed into a corrugated sheet-like thin film on the corrugated sheet-like surface of each substrate such that a positive voltage and a negative voltage can be applied to the electrodes by the blue phase liquid crystal, and the two substrates are disposed such that each of the protruding components of one of the substrates lies opposite to the recessed components that are included in the other of the substrates and that are adjacent to each other, or electrodes are formed into the corrugated sheet-like thin film on each protruding component of the corrugated sheet-like surface such that a positive voltage and a negative voltage can be applied to the electrode of each of the substrates by the blue phase liquid crystal in a lateral direction and the two substrates is disposed such that the electrodes of the protruding components of one of the two substrates lie opposite to valley components each between the electrodes formed on the protruding components of the other of the two substrates,
  the phase panel operates as a substantially isotropic medium in a case where no voltage is applied to the electrodes, and operates as a half-wave plate at a wavelength used in a case where a voltage is applied to the electrodes;
  the corrugated sheet-like thin film is formed of a material that is transparent at an optical wavelength used,
  the polymer-stabilized blue phase liquid crystal is stabilized by irradiation with light,
  the polarization grating plate includes a plurality of plate segments provided in a plane of the polarization grating plate and each plate segment consists of birefringent media with a thickness of a half-wave plate at the wavelength used;
  each of the plate segments is rectangular or circular and has a birefringence axis rotating with a predetermined period $\wedge$ that is not uniform within the plane of the polarization grating plate, and one or both of the period and a rotating direction of the birefringence axis varies among the plate segments;
  the optical beam deflection elements are stuck and stacked together using a resin that has a refractive index substantially identical to a refractive index of the substrate and the phase panel and the polarization grating plate are joined together in such a manner as to overlap; and
  driving each of the electrodes of the phase panel of the optical beam deflection elements using, in a predetermined order, a set of rectangular waves reversed between positive and negative and each having a time width of T and an absolute value of V (state "1") and a zero voltage (state "0").

14. The method for driving the optical beam deflection element according to claim 13, wherein application to the electrodes of the same phase panel of the stacked optical beam deflection elements or the electrodes of the same panel segment is synchronous.

15. The method for driving the optical beam deflection element according to claim 13, wherein the time width T is smaller than or equal to 1 millimeter second, and the driving voltage reversed between positive and negative has an absolute value larger than or equal to 5 V.

16. The method for driving the optical beam deflection element according to claim 13, wherein overriding is performed by setting the absolute voltage value for first several sets of the rectangular waves larger than the absolute voltage value for the subsequent rectangular waves.

* * * * *